Oct. 11, 1932.                F. H. OWENS                1,881,903
MOTION PICTURE CAMERA AND FILM MAGAZINE
Filed Oct. 18, 1928          2 Sheets-Sheet 1
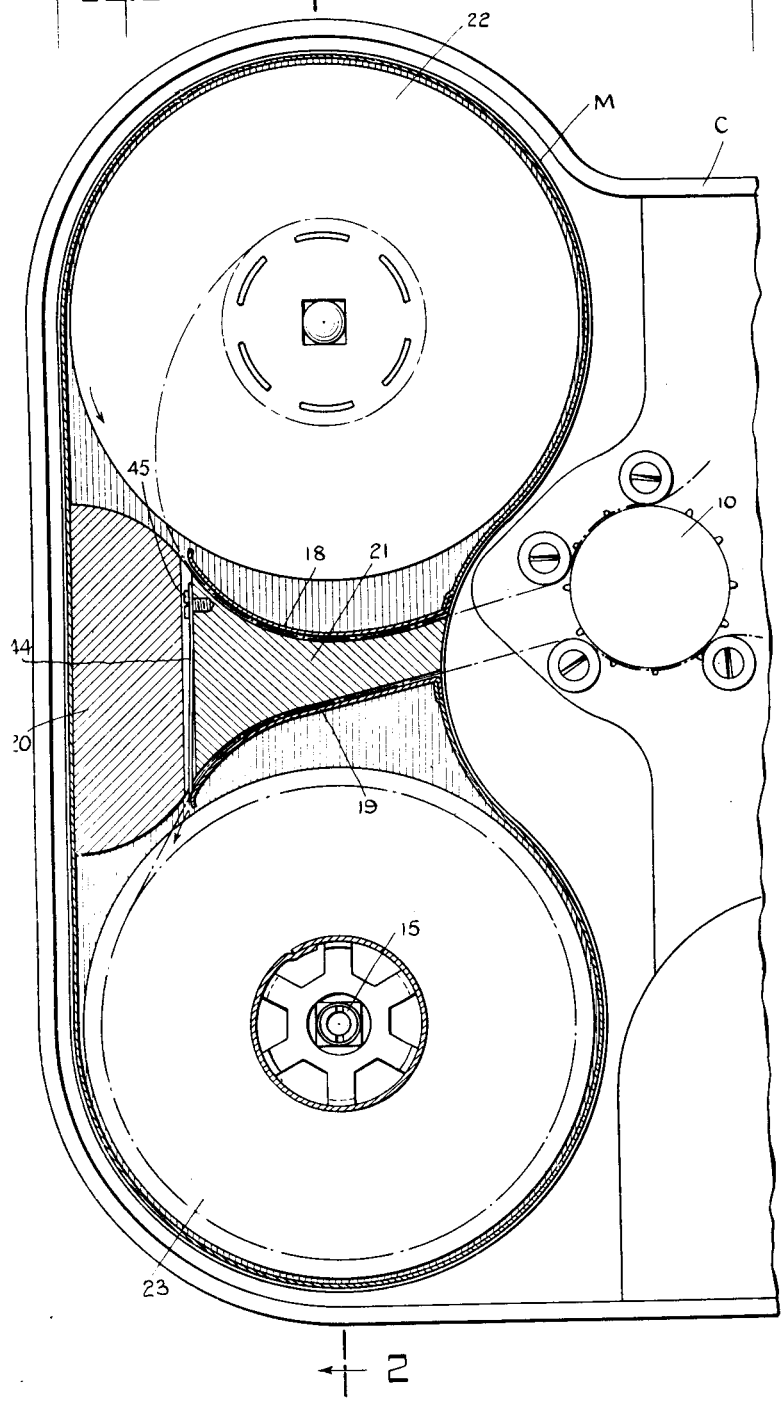
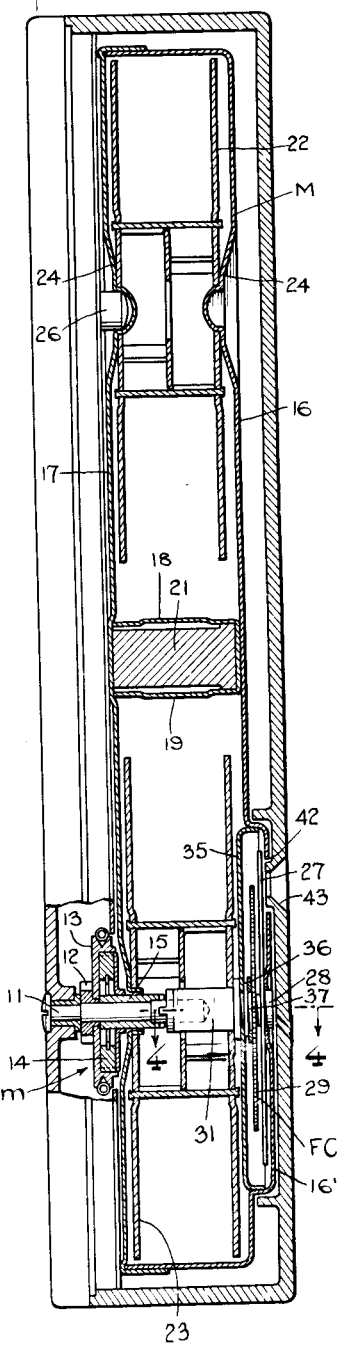
INVENTOR
Freeman H. Owens
BY
ATTORNEYS Oct. 11, 1932.    F. H. OWENS    1,881,903
MOTION PICTURE CAMERA AND FILM MAGAZINE
Filed Oct. 18, 1928    2 Sheets-Sheet 2
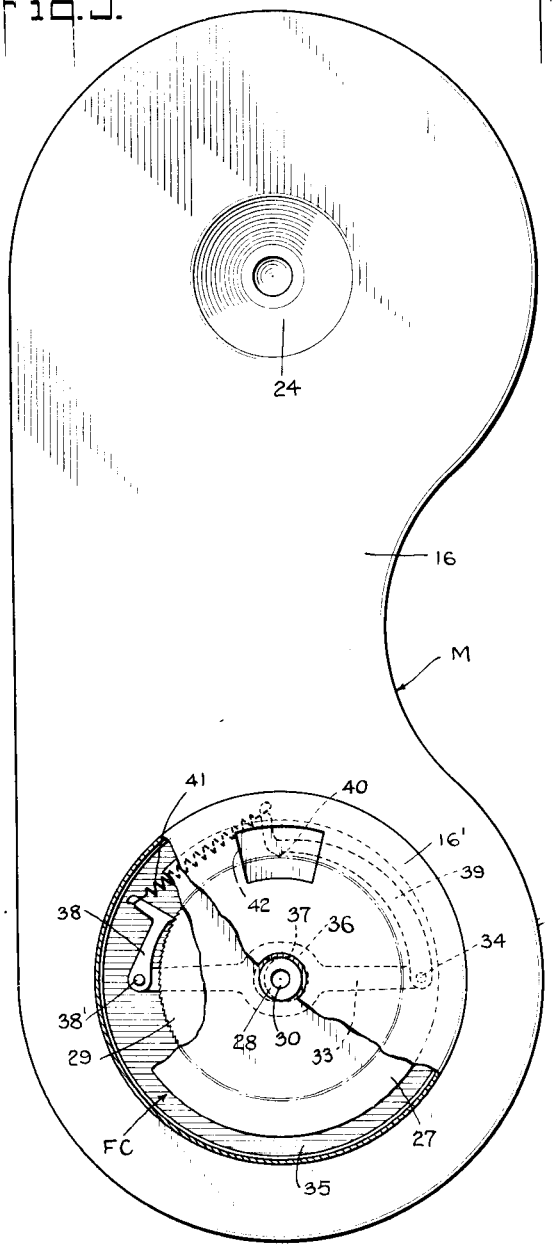
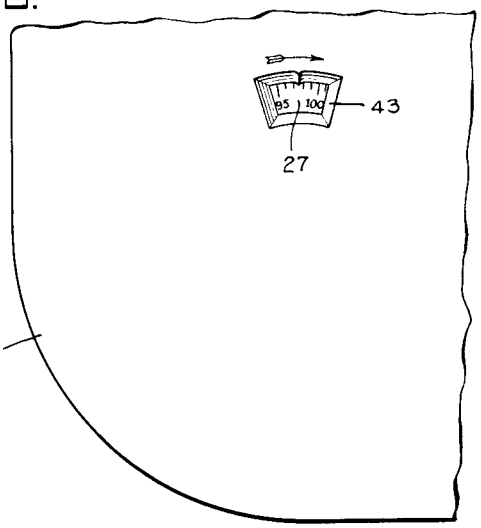
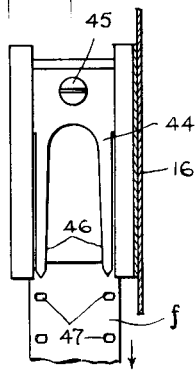
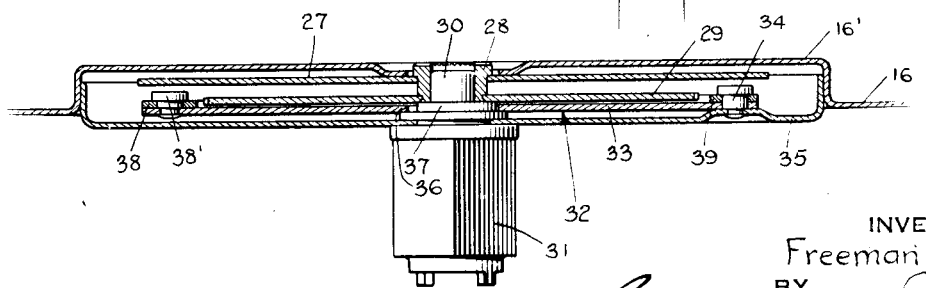
INVENTOR
Freeman H. Owens
BY
Cavanagh + James
ATTORNEYS Patented Oct. 11, 1932

1,881,903

UNITED STATES PATENT OFFICE

FREEMAN H. OWENS, OF NEW YORK, N. Y.

MOTION PICTURE CAMERA AND FILM MAGAZINE

Application filed October 18, 1928. Serial No. 313,311.

This invention relates to motion picture apparatus, and relates more particularly to a combined motion picture camera and projector; and has special reference to the provision of an improved film magazine for use with the apparatus when employed as a camera.

The prime object of my present invention centers about the provision of an improved camera film magazine constructed and designed to accomplish a number of desiderata met with in the use and operation of combined motion picture cameras and projectors, particularly of the portable type.

In the use and operation of such combined motion picture cameras and projectors, it is ofttimes desired to convert the camera into a projector before the full camera reel has been exposed. This necessitates the removal of the film magazine from the camera and therefore dissociates the magazine from footage counters which usually form a part of the camera apparatus and which function for indicating the length of film exposed or unexposed in the camera. It is desirable, however, to more closely associate such indicating mechanism or footage counters with the film magazine so as to obviate the objections incident to the separation of the film magazine from the indicating means on the camera apparatus. It is a prime desideratum of my present invention, therefore, to provide a film magazine embodying a film feeding indicating means or footage counter forming a unitary part therewith constructed so as to be operable by the film feeding means of the camera when the magazine is placed in the camera and so as to provide a record on the magazine unchangeably associated with the film therein for correctly denoting the relation between the exposed and unexposed portions of the film reel in the magazine.

It is further desirable when the film magazine is removed from the camera, either when or before the entire film therein has been exposed, to prevent the user from tampering with the already exposed film. It is therefore a further object of my invention to provide a film magazine embodying means which traps or engages the exposed film fed into the magazine and prevents the unwarranted withdrawal of the same from the magazine.

Still further objects of the invention relate to the provision of a combined camera and film magazine constructed so that the indicating means which forms a unitary part of the magazine may be viewed or seen on or through the camera casing; and the still further provision of a film magazine and the combination of a film magazine and a footage counter or indicating means composed of few parts and which may be manufactured at a low cost of production and sold at a low figure.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, and in which:

Fig. 1 is a side elevational view of the camera and magazine of the invention with parts shown in cross-section, Fig. 2 is a view thereof taken in cross-section in the plane of the line 2—2, Fig. 1, Fig. 3 is a side elevational view of the magazine shown detached from the camera, Fig. 4 is a fragmentary view taken on an enlarged scale in cross-section in the plane of the line 4—4, Fig. 2, and Figs. 5 and 6 are fragmentary views of details.

Referring now more in detail to the drawings, the invention is shown to comprise a camera film magazine M removably receivable in a camera casing C, the said magazine including an indicating mechanism or footage counter FC which forms a unitary part therewith and which therefore is removable from the camera casing C as a unit with the magazine M, the footage counter FC comprising means which is adapted to be coupled to the film operating means of the camera represented by the film take-up mechanism m.

The camera casing C preferably comprises a construction such as is more particularly set forth in my copending applications to combined camera & projecting apparatus, Ser. No. 267,158, and projection machine, Ser. No. 267,157, both filed April 4, 1928, said camera casing housing the operating mechanism of the apparatus, which includes a film sprocket 10 operative for feeding the film to and from the magazine M and the film take-up mechanism m, which latter comprises a spindle 11 journalled in a wall of the camera C, as shown particularly in Fig. 2 of the drawings, which spindle carries a driven pinion 12 to which is affixed a clutch element 13 mating with a friction clutch element 14, a coupling member 15 being connected to the mating clutch element 14, the said coupling member serving for being coupled to the film take-up reel of the magazine M and to the footage counter FC.

The magazine M comprises a light-proof housing preferably consisting of a body 16 and a cover 17 separably attachable together to define a light-proof closed housing and provided with the curved light trap film exit and entrant passages 18 and 19. The magazine is provided centrally thereof with the blocks 20 and 21 which separate the same into upper and lower compartments, the upper compartment being designed to hold a film feeding reel 22 and the lower compartment being designed to hold a film take-up reel 23. The side walls of the magazine housing are provided with suitable depressions such as 24, 24 adapted to mate with positioning elements in the camera such as the stud 26, and also intended for centering the reels such as 22.

The footage counter FC forming a part of the magazine M is associated with the film take-up reel 23 and comprises an indicating element or dial 27 fixed to a hub 28, to which hub is affixed a ratchet wheel 29, the said ratchet wheel being operable by the rotation of a spindle 30 affixed to a coupling member 31 through the intermediation of a cam operated linkage means generally designated as 32.

The linkage means 32 comprises a lever 33 pivoted by the stud 34 on a plate 35, which plate is removably affixed to a dished portion 16' of the magazine section 16, the said lever being provided with a central annular portion 36 encircling a cam section 37 integral with the spindle 30 and being further provided at its free end with a pawl 38 pivoted thereto on the stud 38'. Preferably the said lever 33 is also provided at its pivoted end 34 with an arcuate arm 39 having a toothed section 40 at its free end; and preferably the free ends of the pawl 38 and arm 39 are connected together by means of the tension spring 41. By means of this construction it will be seen that rotation of the spindle 30 will oscillate (due to the cam action of the section 37 thereof) the lever 33 about its pivot 34, causing the pawl 38 to advance the ratchet wheel 29, return rotation of the ratchet wheel being prevented by the toothed end 40 of the arcuate arm 39. Rotation of the ratchet wheel will rotate the indicating means or dial 27, which is exposed at a window 42 provided in the casing wall 16. It will be understood that the spindle 30 is movably supported in the hub 28, and that the said hub, dial 27 and ratchet wheel 29 operating as a unit are prevented from rotating with the spindle 30 by the linkage mechanism 32.

It will thus be seen that when the magazine M is placed in the camera, the coupling elements 15 and 31 will be moved into mating or coupling relation, so that the operation of the take-up mechanism m and the take-up reeling means 23 will cause the actuation of the footage counter FC. It will be further seen that when the magazine is removed it will contain a permanent record observable through the window of the relation between the amounts of exposed and unexposed film in the magazine. An important factor in the design of the combination is the small space which the footage counter occupies, since it is desirable that the combined magazine and footage counter occupy the same lateral dimensions or width as the magazine itself; and this is accomplished by the design of the indicating element and linkage means as shown in Fig. 4 of the drawings, all of which parts are suitably supported on and between the plate 35 and the dished portion 16' of the magazine wall.

For the purpose of permitting the footage counter to be observed from the exterior of the camera, a wall of the camera casing is provided with an observation window 43 with which the window 42 of the magazine is adapted to register, as clearly shown in Fig. 2 of the drawings, the dial 27 being thus observable through the aligned windows 42 and 43.

For the purpose of preventing the unwarranted withdrawal of the exposed film on the take-up reel 23, I provide means which functions to engage the film and particularly the film feeding sprocket holes thereof to permit freedom of feeding the film onto the reel 23, but to prevent unwarranted or return withdrawal thereof. This means preferably comprises a simple toothed member, preferably resilient, in the form of a forked element 44 secured to the block 21 by the screw 45, the tines 46, 46 of which project into the entrant passage 19 for engagement with the film sprocket openings 47 of the film F, as clearly shown in Figs. 1 and 6 of the drawings. It will be apparent from the construction here shown that the film may be freely fed in the direction indicated by the arrow, but that such film cannot thereafter be withdrawn from the reel 23 by movement in the opposite direction.

The use and operation of the improved film magazine of my invention and the many advantages thereof will in the main be fully apparent from the above detailed description thereof. It will be further apparent that while I have shown and described my invention in its preferred form, that many changes and modifications may be made in the structure disclosed, without departing from the spirit of the invention, defined in the following claims.

I claim:

1. A motion picture film magazine comprising a housing for holding a reel of film, the said housing being removably attachable to a camera, film take-up reeling means on said magazine housing, the said film being adapted to be fed from said reel out of the housing and back to said film take-up reeling means in the operation of the camera, a window in a wall of said housing, and a footage counter mechanism carried by said housing and including an indicator movable past said window, and means connecting said indicator with said film take-up reeling means.

2. A motion picture film magazine comprising a housing for holding a reel of film, the said housing being removably attachable to a camera and including separable body and cover sections, film take-up reeling means on said magazine housing, the film being adapted to be fed from said reel out of the housing and back to said film take-up reeling means in the operation of the camera, a window in a wall of one of the housing sections, and a footage counter mechanism carried by said one of the housing sections and including a dial movable past said window, and means connecting said dial with said film take-up reeling means.

3. The combination of a camera and a motion picture film magazine comprising, a camera casing, a housing for holding a reel of film, the said housing being removably attachable to the camera casing, film take-up reeling means on said magazine housing, the said film being adapted to be fed from said reel to said film take-up reeling means in the operation of the camera, an exposure window in said camera casing, an exposure window in a wall of said housing adapted to register with the casing window, and a footage counter mechanism carried by said housing and including an indicator movable past said windows, and means connecting said indicator with said film take-up reeling means.

4. A motion picture film magazine comprising a housing for holding a reel of film, the said housing being removably attachable to a camera and the said film being adapted to be fed from and returned to said housing in the operation of the camera, and means in said housing continuously cooperating with the film returning to the housing for engaging the same to prevent withdrawal of the exposed portion of the film.

5. A motion picture film magazine comprising a housing for holding a reel of film, the said housing being removably attachable to a camera and the said film being adapted to be fed from and returned to said magazine housing in the operation of the camera, and means in said housing cooperating with the sprocket openings of the film for engaging the same to prevent withdrawal of the exposed portion of the film.

6. A motion picture film magazine comprising a housing for holding a reel of film, the said housing being removably attachable to a camera, light proof film entrant and exit passages in said housing through which the film is adapted to be fed from and to the housing in the operation of the camera, and a uni-directionally operative holding member at said entrant passage arranged to continuously engage the film and functioning to prevent withdrawal of the already exposed film.

7. A motion picture film magazine comprising a housing for holding a reel of film, the said housing being removably attachable to a camera, light proof film entrant and exit passages in said housing through which the film is adapted to be fed from and to the housing in the operation of the camera, and a toothed member at said entrant passage arranged to engage the sprocket openings in the film and functioning to permit feeding of the film into the housing but to prevent withdrawal of the already exposed film from the housing.

8. A motion picture film magazine comprising a housing for holding a reel of film, the said housing being removably attachable to a camera, take-up reeling means on said housing, the said film being adapted to be fed from said reel to the reeling means in the operation of the camera, and a resilient toothed member arranged in said housing to engage the sprocket openings in the film and functioning to prevent withdrawal of the already exposed film.

Signed at New York, in the county of New York and State of New York, this 3rd day of Oct. A. D. 1928.

FREEMAN H. OWENS.